(12) United States Patent
Wei

(10) Patent No.: US 8,570,647 B1
(45) Date of Patent: Oct. 29, 2013

(54) OPTICAL ELEMENT FOR TRANSMITTING ULTRAVIOLET LIGHT AND LIGHT SOURCE DEVICE INCLUDING SAME

(71) Applicant: Chao-Tsang Wei, New Taipei (TW)

(72) Inventor: Chao-Tsang Wei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/655,665

(22) Filed: Oct. 19, 2012

(30) Foreign Application Priority Data

May 2, 2012 (TW) .................................. 101115585

(51) Int. Cl.
*G02B 5/08* (2006.01)
*G02B 5/28* (2006.01)
*G02B 5/20* (2006.01)
*G02B 1/11* (2006.01)

(52) U.S. Cl.
CPC ................ *G02B 5/208* (2013.01); *G02B 1/115* (2013.01); *G02B 5/283* (2013.01)
USPC ............................ 359/359; 359/586; 359/588

(58) Field of Classification Search
USPC .................................. 359/350–361, 584–590
See application file for complete search history.

(56) References Cited

U.S. PATENT DOCUMENTS

| 6,686,676 | B2 * | 2/2004 | McNulty et al. | 313/112 |
| 7,196,835 | B2 * | 3/2007 | Peumans et al. | 359/245 |
| 2006/0240232 | A1 * | 10/2006 | Faris | 428/212 |
| 2009/0225241 | A1 * | 9/2009 | Fujii | 349/5 |
| 2011/0127899 | A1 * | 6/2011 | Chowdhury | 313/112 |
| 2011/0150019 | A1 * | 6/2011 | Leatherdale et al. | 372/45.01 |

* cited by examiner

*Primary Examiner* — Thong Nguyen
(74) *Attorney, Agent, or Firm* — Altis & Wispro Law Group, Inc.

(57) ABSTRACT

An optical element includes a substrate and a film on the substrate. The substrate made of sapphire. The film is configured for increasing transmission of ultraviolet lights. The film is stacked by a plurality of high refractive index layers and a plurality of low refractive index layers alternately stacked on the substrate.

4 Claims, 3 Drawing Sheets

OPTICAL ELEMENT FOR TRANSMITTING ULTRAVIOLET LIGHT AND LIGHT SOURCE DEVICE INCLUDING SAME

BACKGROUND

1. Technical Field

The present disclosure relates to optical elements, and particularly, to an optical element for transmitting ultraviolet light and a light source device including the optical element.

2. Description of Related Art

Sapphires have excellent hardness and wear-resistance, and are used in optics and machinery. The sapphire can be used as a cover glass to protect an ultraviolet light source as it transmits ultraviolet light. However, the transmissivity of the sapphire at ultraviolet wavelengths is unsatisfactory.

Therefore, it is desirable to provide an optical element and a light source device, which can overcome the limitations described.

DETAILED DESCRIPTION

Embodiments of the disclosure will be described with reference to the drawings.

Figure 1:
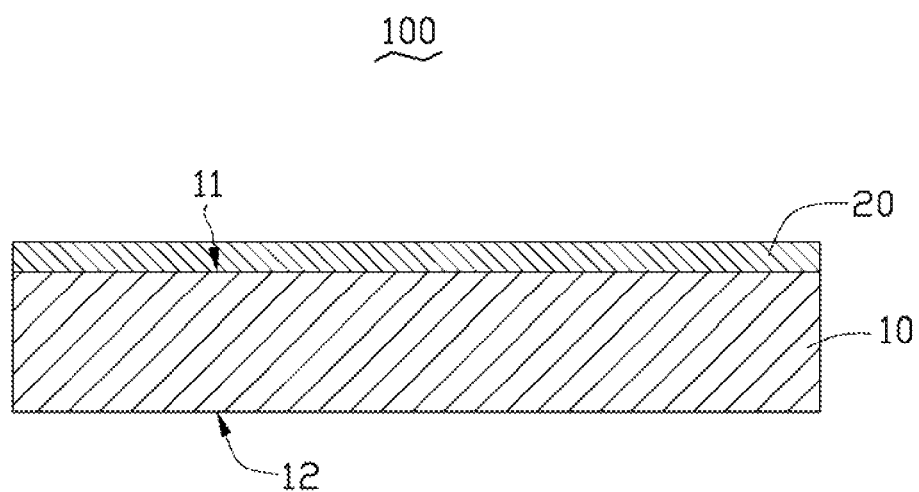
FIG. 1 is a cross-sectional schematic view of an optical element in accordance with an exemplary embodiment.

Referring to FIG. 1, an optical element 100, according to an exemplary embodiment, is configured to transmit ultraviolet light and visible light. The optical element 100 includes a substrate 10 and a film 20 formed on the substrate 10.

The substrate 10 is plated shaped and is made of sapphire. Sapphire is a gemstone variety of the mineral corundum and has a hexagonal crystal structure. The main chemical component of sapphire is aluminum oxide ($Al_2O_3$), and the refractive index of the sapphire is from about 1.762 to about 1.770. A transmissivity of the substrate 10 at ultraviolet wavelengths from about 190 nm to about 280 nm (UVC) is lower than 84%, at ultraviolet wavelengths from about 280 nm to about 315 nm (UVB) is lower than 85%, and at ultraviolet wavelengths from about 315 nm to about 400 nm (UVA) is lower than 86%. The substrate 10 includes a first surface 11 and a second surface 12 opposite to the first surface 11.

The film 20 is configured to increase the transmissivity of the substrate 10 at the ultraviolet lights and is coated on the substrate 10 by a sputter method or an evaporation method. The film 20 includes a number of high refractive index layers and a number of low refractive index layers alternately stacked on the substrate 10. The material of the high refractive index layer can be hafnium oxide ($HfO_2$), and the refractive index of $HfO_2$ is from about 2.0 to about 2.15. The material of the low refractive index layer can magnesium fluoride ($MgF_2$) or silicon dioxide ($SiO_2$), and the refractive index of $MgF_2$ is 1.38 and the refractive index of $SiO_2$ is from about 1.46 to about 1.49.

In the embodiment, the film 20 is coated on the first surface 11 of the substrate 10.

The high refractive index layer and the low refractive index layer can choose other materials.

If the material of the low refractive index layer is $MgF_2$, the film 20 is stacked by a first layer and a second layer in an order facing away from the first surface 11. The first layer is the high refractive index layer, and the second layer is the low refractive index layer. The thickness of the first layer is about 70±8 nm, and the thickness of the second layer is about 50±8 nm. In the embodiment, the thickness of the first layer is about 70.98 nm, and the thickness of the second layer is about 50.53 nm. It should be understood that the number of layers and the material of each layer of the film 20 can be changed according to actual requirements.

When the material of the lower refractive index layer is $SiO_2$, the film 20 is stacked by a first layer and a second layer in an order facing away from the first surface 11. The first layer is the high refractive index layer, and the second layer is the low refractive index layer. The thickness of the first layer is about 62±8 nm, and the thickness of the second layer is about 42±8 nm. In the embodiment, the thickness of the first layer is about 62.68 nm, and the thickness of the second layer is about 42.97 nm. It should be understood that the number of layers and the material of each layer of the film 20 can be changed according to actual requirements.

Figure 2:
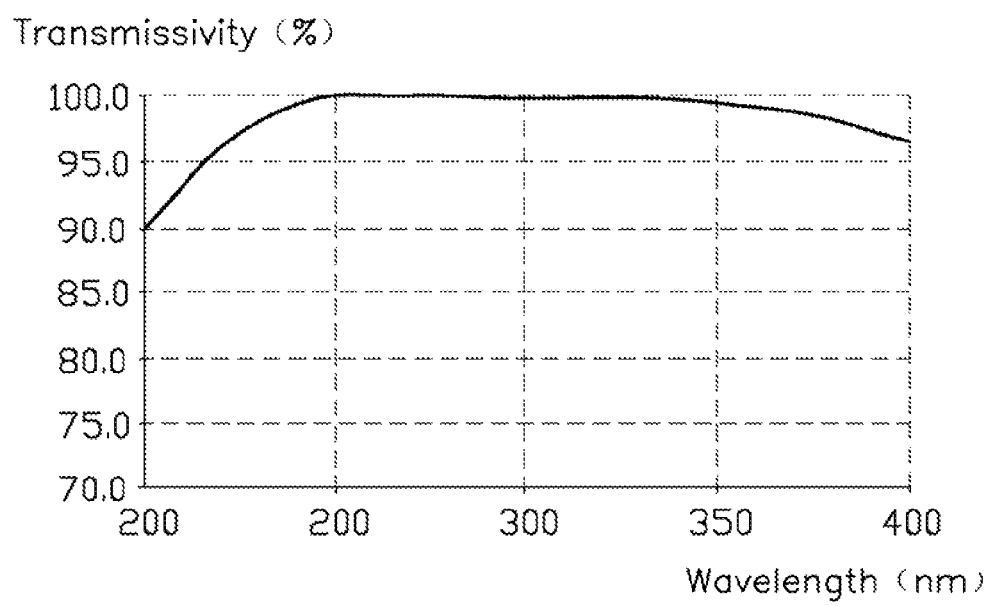
FIG. 2 is a spectrum chart of the optical element of FIG. 1.

Referring to FIG. 2, a graph showing a spectrum of the optical element 100 is illustrated. The transmissivity of the optical element 100 at the ultraviolet wavelengths from about 190 nm to about 280 nm (UVC) is greater than 90%. The transmissivity of the optical element 100 at the ultraviolet wavelengths from about 280 nm to about 315 nm (UVB) is greater than 98%. The transmissivity of the optical element 100 at the ultraviolet wavelengths from about 315 nm to about 400 nm (UVA) is greater than 96%.

Figure 3:
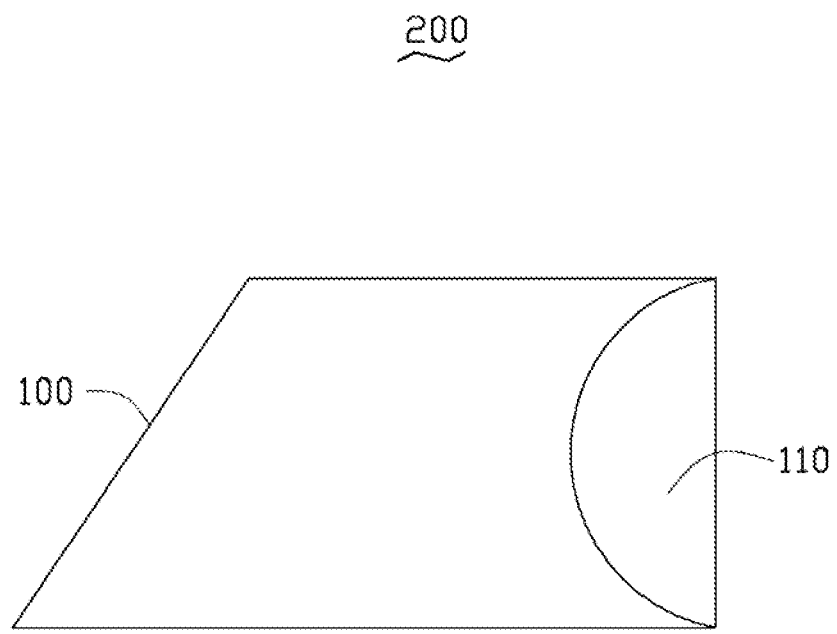
FIG. 3 is a cross-sectional schematic view of a light source device using the optical element of FIG. 1.

Referring to FIG. 3, a light source device 200, according to an exemplary embodiment, includes the optical element 100 and an ultraviolet light lamp 110. The ultraviolet light lamp 110 emits ultraviolet lights at wavelengths from about 190 nm to about 400 nm. In the illustrated embodiment, the optical element 100 is substantially cylindrical-shaped, the ultraviolet light lamp 110 is received in the optical element 100, and thus the ultraviolet light lamp 110 is protected from being damaged by the optical element 100.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical element, comprising:
   a substrate made of sapphire, the substrate comprising a first surface and a second surface opposite to the first surface; and
   a film covered on the first surface and configured for increasing transmissivity of ultraviolet lights; the film stacked by a first layer and a second layer in an order facing away from the first surface; the first layer is one high refractive index layer, the second layer is one low refractive index layer, a material of the high refractive index layer being hafnium oxide ($HfO_2$) having a refractive index from about 2.0 to about 2.15, and a material of the low refractive index layer being magnesium fluoride ($MgF_2$) having a refractive index of about 1.38, a thickness of the first layer is about 70±8 nm, and a thickness of the second layer is about 50±8 nm.

2. The optical element of claim 1, wherein the film consists of the first layer and the second layer.

3. A light source device, comprising:
   an ultraviolet light lamp; and
   an optical element holding the ultraviolet light lamp therein, the optical element comprising:

a substrate made of sapphire, the substrate comprising a first surface and a second surface opposite to the first surface; and a film covered on the first surface and configured for increasing transmissivity of ultraviolet lights; the film stacked by a first layer and a second layer in an order facing away from the first surface; the first layer is one high refractive index layer, the second layer is one low refractive index layer, a material of the high refractive index layer being hafnium oxide ($HfO_2$) having a refractive index from about 2.0 to about 2.15, and a material of the low refractive index layer being magnesium fluoride ($MgF_2$) having a refractive index of about 1.38, a thickness of the first layer is about 70±8 nm, and a thickness of the second layer is about 50±8 nm.

4. The light source device of claim 3, wherein the film consists of the first layer and the second layer.

* * * * *